(12) United States Patent
Duffin et al.

(10) Patent No.: US 8,648,276 B2
(45) Date of Patent: Feb. 11, 2014

(54) METHOD FOR FABRICATION OF A QUADRUPOLE MASS FILTER OR QUADRUPOLE ION TRAP USING ELECTRODE DISCHARGE MACHINING

(75) Inventors: Jason Duffin, Wigston (GB); Stephen Taylor, Liverpool (GB)

(73) Assignee: Advanced Sensors Ltd., Carrickfergus, Co. Antrim (GB)

( * ) Notice: Subject to any disclaimer, the term of this patent is extended or adjusted under 35 U.S.C. 154(b) by 158 days.

(21) Appl. No.: 13/062,601

(22) PCT Filed: Sep. 3, 2009

(86) PCT No.: PCT/GB2009/051115
§ 371 (c)(1),
(2), (4) Date: Jul. 11, 2011

(87) PCT Pub. No.: WO2010/026424
PCT Pub. Date: Mar. 11, 2010

(65) Prior Publication Data
US 2011/0253678 A1    Oct. 20, 2011

(30) Foreign Application Priority Data

Sep. 5, 2008  (GB) .................................. 0816258.8
Oct. 17, 2008  (GB) .................................. 0819028.2

(51) Int. Cl.
*B23H 9/00* (2006.01)
(52) U.S. Cl.
USPC ..................................... 219/69.17; 219/69.12
(58) Field of Classification Search
USPC .......................................... 219/69.12, 69.17
See application file for complete search history.

(56) References Cited

U.S. PATENT DOCUMENTS

| | | | | |
|---|---|---|---|---|
| 5,384,461 A | * | 1/1995 | Jullien et al. | 250/292 |
| 5,852,270 A | * | 12/1998 | Holkeboer | 219/69.12 |
| 6,025,591 A | * | 2/2000 | Taylor et al. | 250/292 |
| 6,049,052 A | * | 4/2000 | Chutjian et al. | 219/69.12 |
| 6,465,792 B1 | * | 10/2002 | Baptist | 250/396 R |
| 7,154,088 B1 | * | 12/2006 | Blain et al. | 250/292 |
| 7,351,963 B2 | * | 4/2008 | Rebettge et al. | 250/292 |
| 2004/0031918 A1 | * | 2/2004 | Schoen et al. | 250/282 |
| 2004/0195504 A1 | * | 10/2004 | Senko et al. | 250/291 |
| 2007/0114391 A1 | * | 5/2007 | Mordehai et al. | 250/290 |
| 2009/0008543 A1 | * | 1/2009 | Reinhold | 250/282 |

FOREIGN PATENT DOCUMENTS

RU    694917 A  *  10/1997

* cited by examiner

*Primary Examiner* — Geoffrey S Evans
(74) *Attorney, Agent, or Firm* — Gunn, Lee & Cave, P.C.

(57) ABSTRACT

A method for fabricating a quadrupole mass filter (QMF) or quadrupole ion trap (QIT) capable of generating a hyperbolic electric field. The method comprises: (a) cutting four elongate erodible metal workpieces axially at opposing extremities; (b) parallel mounting the four elongate erodible metal workpieces axially in an elongate slot in an insulating housing in a mutually spaced apart disposition such that an axial bore is formed therebetween whereby a first part of each elongate erodible metal workpiece is freely inward facing and the cutting forms a recess remote from the axis of the insulating housing; (c) electrically connecting the erodible metal workpieces; and (d) generating electrical discharges between the erodible metal workpiece and a wire electrode as the wire electrode passes through the axial bore to erode the erodible metal of the first part of the erodible metal workpiece to a hyperbolic profile.

9 Claims, 2 Drawing Sheets

METHOD FOR FABRICATION OF A QUADRUPOLE MASS FILTER OR QUADRUPOLE ION TRAP USING ELECTRODE DISCHARGE MACHINING

This is a National Phase Application filed under 35 U.S.C. 371 as a national stage of PCT/GB2009/051115, filed Sep. 3, 2009, and claims priority benefit from Great Britain Application No. 0819028.2, filed Oct. 17, 2008 and Great Britain Application No. 0816258.8, filed Sep. 5, 2008, the content of each of which is hereby incorporated by reference in its entirety.

BACKGROUND

1. Technical Field

The present invention relates to a method for fabricating a quadrupole mass filter (QMF) or a quadrupole ion trap (QIT).

2. Description of Related Art

Mass spectrometers generally rely on introducing a sample into a vacuum chamber where it is ionized by an ion source. The ions are separated according to their charge to mass ratio before they reach a detector. In a conventional quadrupole mass spectrometer (QMS), four circular electrodes disposed at each point of a compass create an electric field in their enclosed space. These electrodes are typically made from stainless steel up to I em in diameter and 15 cm long and require precision manufacturing. In WO-A-96/31901, there are disclosed electrodes in the form of metal coated glass fibres.

Recent developments in mass spectrometers have advanced rapidly with the main focus on building fully integrated devices that can be made portable whilst maintaining good performance. To achieve this, the miniaturization of mass spectrometer components such as mass analyzers has been pursued. Miniaturization of mass spectrometers is presently carried out by microelectromechanical systems (MEMS) based mainly on semiconductor microengineering with metal deposits. Since complex electrode geometries such as hyperbolic cannot be machined at micro-scale using MEMS, simpler geometries such as cylindrical and planar are used to give an approximation to a hyperbolic field.

One of the first miniature analyzers constructed using MEMS was a quadrupole mass filter (QMF) with cylindrical electrodes [Taylor S et al. Silicon based Quadrupole Mass Spectrometry using Microelectromechanical Systems. *J. Vac. Sci. Technol. B* 2001, 19, 557-562]. Other miniature mass analyzers include a time-of-flight mass filter [Wapelhorst E et al: Complex MEMS: a Fully Integrated TOF Micro Mass Spectrometer. *Sensors and Actuators A* 2007, 138, 22-27], a cylindrical micro ion trap that easily forms arrays [Blain M G et al: Towards the Hand-Held Mass Spectrometer: Design Considerations, Simulation and Fabrication of Micrometer-Scaled Cylindrical Ion Traps. *Int. J. Mass Spectrom.* 2004, 236, 91-104; Pau S et al: M. Microfabricated Quadrupole Ion Trap for Mass Spectrometer Applications. *Phys. Rev. Lett.* 2006, 96, 120801; and Van Amerom F H W et al: Microfabrication of Cylindrical Ion Trap Mass Spectrometer Arrays for Handheld Chemical Analyzers. *Chem Eng. Comm.* 2008, 195, 98-114], a rectilinear ion trap with planar electrodes [Song Y et al: Novel Linear Ion Trap Mass Analyzer Composed of Four Planar Electrodes. *J. Am. Soc. Mass Spectrom.* 2006, 17, 631-639] and a halo ion trap [Austin D E et al: Halo Ion Trap Mass Spectrometer. *Anal. Chem.* 2007, 79, 2927-2932]. Ion source miniaturization has also advanced with the realization of a carbon nanotube electron impact ion source [Bower C A et al: On-Chip Electron Impact Ion Source using Carbon Nanotube Field Emitters. *Appl. Phys. Lett.* 2007, 90, 124102].

U.S. Pat. No. 5,852,270 discloses a wire-cut method for manufacturing a miniature quadrupole.

SUMMARY OF THE INVENTION

The present invention seeks to improve the fabrication of components of a miniaturised QMS by exploiting electrode-discharge machining which achieves highly accurate profiles which (in use) lead to the attainment of hitherto unachievable electric field profiles.

Viewed from a first aspect the present invention provides a method for fabricating a quadrupole mass filter (QMF) or quadrupole ion trap (QIT) capable of generating a hyperbolic (preferably substantially ideal hyperbolic) electric field comprising:
(a) back-cutting four elongate erodible metal workpieces axially at opposing extremities;
(b) substantially parallel mounting the four elongate erodible metal workpieces axially in an elongate slot in an insulating housing in a mutually spaced apart disposition such that an axial bore is formed therebetween whereby a first part of each elongate erodible metal workpiece is freely inward facing and the back cut forms a recess remote from the axis of the insulating housing;
(c) electrically connecting the erodible metal workpieces; and
(d) generating a plurality of electrical discharges between the erodible metal workpiece and a wire electrode as the wire electrode passes through the axial bore to erode the erodible metal of the first part of the erodible metal workpiece to a hyperbolic profile.

The method of the invention is not limited by reassembly errors and is not reliant on accurate pre-machining of the erodible metal workpieces. The accuracy of the method is contributed to by step (a) and is dependent primarily on step (d) thereby permitting control of tolerances and fabrication of a QMF or QIT at small geometries. By avoiding the need to pre-drill a bore for the wire electrode or to use insulating strips, the method is low cost and rapid.

The present invention may be deployed to attain a hitherto unachievable substantially ideal hyperbolic electric field profile by a QMF characterized by a small inscribed radius. The method of the invention may make it possible to fabricate accurately a hyperbolic profile with an inscribed radius of 2 mm or less. Preferably the inscribed radius is less than 1 mm (eg about 0.9 mm).

Preferably the inscribed radius ($r_o$) is in the range 400 microns to 0.9 mm, preferably 0.1 to 0.9 mm.

Preferably the shape of each elongate erodible metal workpiece is substantially quadrantal.

Preferably in step (a) the four elongate erodible metal workpieces are back-cut (eg recessed) substantially rectangularly.

Preferably in step (b), the four erodible metal workpieces are substantially parallel mounted such that the back-cut is adjacent to the circumference of the elongate slot. The elongate slot may be substantially square or cylindrical.

The erodible metal removed from the erodible metal workpiece in step (d) may be discharged by a flowing fluid. The erodible metal may be steel or molybdenum.

The passage of the wire electrode in step (d) is generally computer-controlled. Preferably the elongate slot of the insulating housing is substantially cylindrical.

In a preferred embodiment, the method is used for fabricating a quadrupole ion trap (QIT) The QIT may be a linear quadrupole ion trap or a 3D quadrupole ion trap.

In a preferred embodiment, the method is used for fabricating a quadrupole mass filter (QMF).

The erodible metal workpieces may be eroded into four elongate electrodes parallel and mutually spaced apart in the insulating housing. Preferably the four elongate electrodes are parallel mounted axially in a substantially square disposition so as to define therebetween an ion receiving volume.

Preferably in step (d) the hyperbolic profile of the first part of the erodible metal workpiece is substantially ideal hyperbolic.

Preferably the QMF or QIT is capable of generating a substantially ideal hyperbolic electric field.

Preferably the QMF or QIT in use generates an electric field described by the potential variation:

$$\phi(x, y, z) = \phi_0 \frac{(x^2 - y^2)}{2r_0^2}$$

Preferably the QMF or QIT in use generates an electric field substantially as illustrated in FIG. 4.

The average resolution R (m/$\Delta$m) at 50% of the peak height achievable by the QMF or QIT is typically 20 or more, preferably 30 or more, more preferably 40 or more, especially preferably 50 or more.

BRIEF DESCRIPTION OF THE DRAWINGS

The present invention will now be described in a non-limitative sense with reference to the accompanying Figures in which.

DETAILED DESCRIPTION

Example 1

Figure 1:
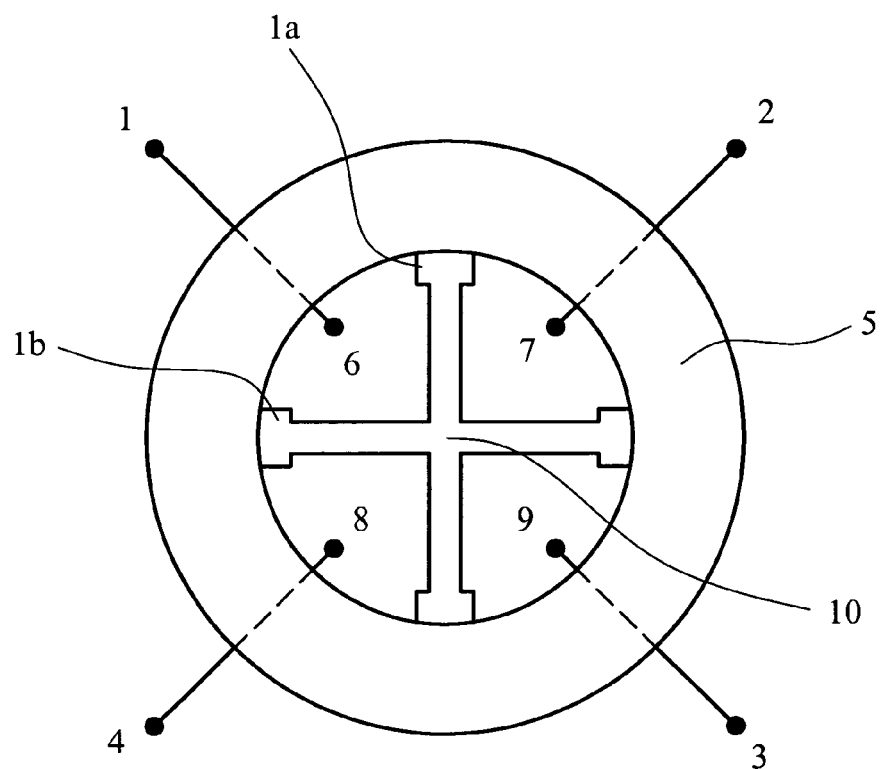
FIG. 1: A schematic end view of an arrangement for carrying out an embodiment of the method of the invention.
Figure 1:
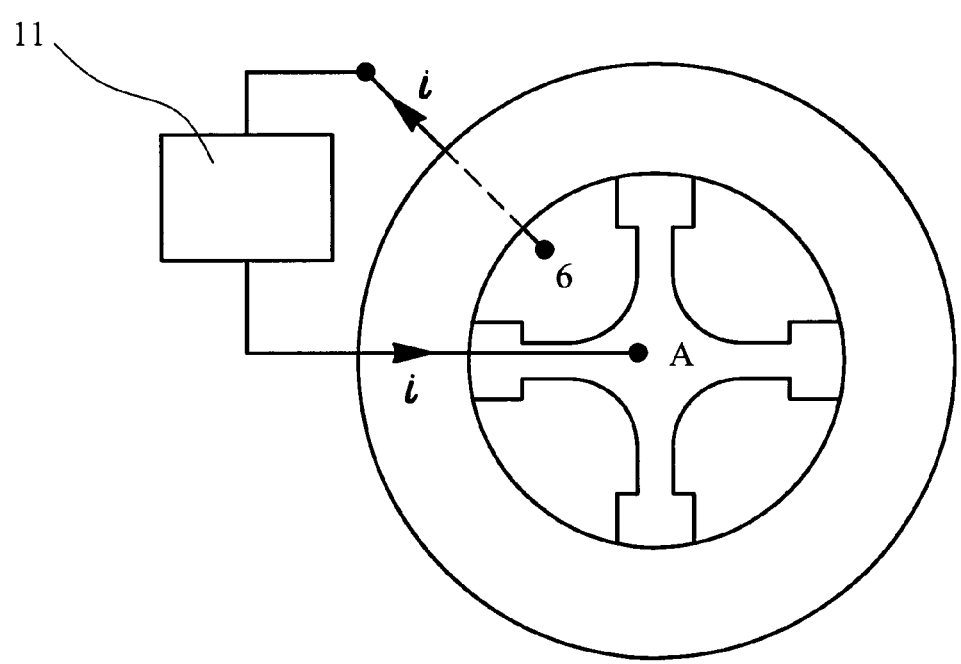

Referring to FIG. 1 which is an end view of an arrangement for carrying out an embodiment of the method of the invention, four erodible metal workpieces 6, 7, 8 and 9 are substantially parallel mounted in an insulated ceramic holder 5 in a spaced apart manner such that there is an axial bore 10 between them. Prior to mounting, each erodible metal workpiece 6, 7, 8 and 9 is backcut (recessed) at opposing extremities 1a, 1b. The back-cuts 1a, 1b sit on the circumference of the housing furthest remote from its axis. Each workpiece 6, 7, 8 and 9 is provided with an electrical connection 1, 2, 3 and 4 for its subsequent use as an electrode.

The workpieces 6, 7, 8 and 9 are connected electrically by a device for generating electrical discharges 11 (such as a FANUC wire electrode discharge machine). A wire electrode A is passed down the axial bore 10 and its path (which determines the final shape of the electrode) is computer controlled. A hyperbolic shaped electrode may be machined where x and y coordinate loci of the wire electrode A are related according to $x^2-y^2=a^2$. If the asymptotes are taken as the coordinate axes, the result is $xy=a^2/2$ or xy=constant. As the wire electrode A is passed down the axial bore 10 (without touching the workpiece 6), the device 11 generates a rapid series of electrical discharges (indicated in FIG. 1 by the current flow i) which serve to erode the free inward face of the workpieces 6, 7, 8 and 9. The metal removed by this step is flushed away by a continuous fluid flow. The repetitive discharges create a set of successively deeper craters in the workpieces 6, 7, 8, and 9 until the final hyperbolic shape is achieved.

Figure 2:
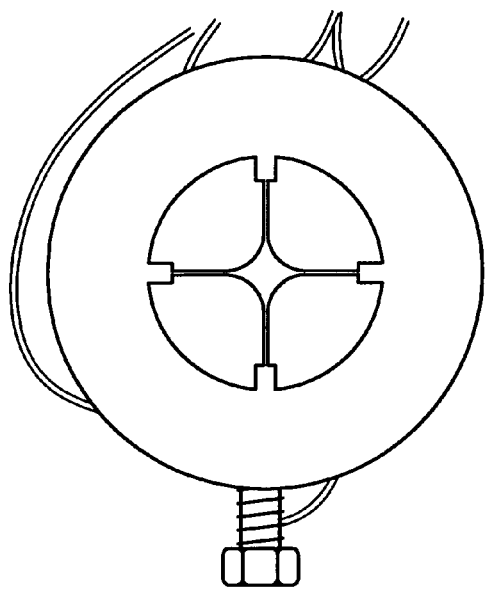
FIG. 2: Hyperbolic QMF with $r_0$=0.9 fabricated according to an embodiment of the method of the invention.
Figure 4:
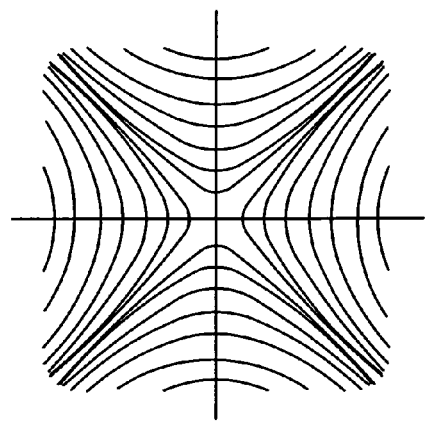
FIG. 4: A hyperbolic electric field exhibited by a hyperbolic QMF prepared by the method of the invention.
Figure 3:
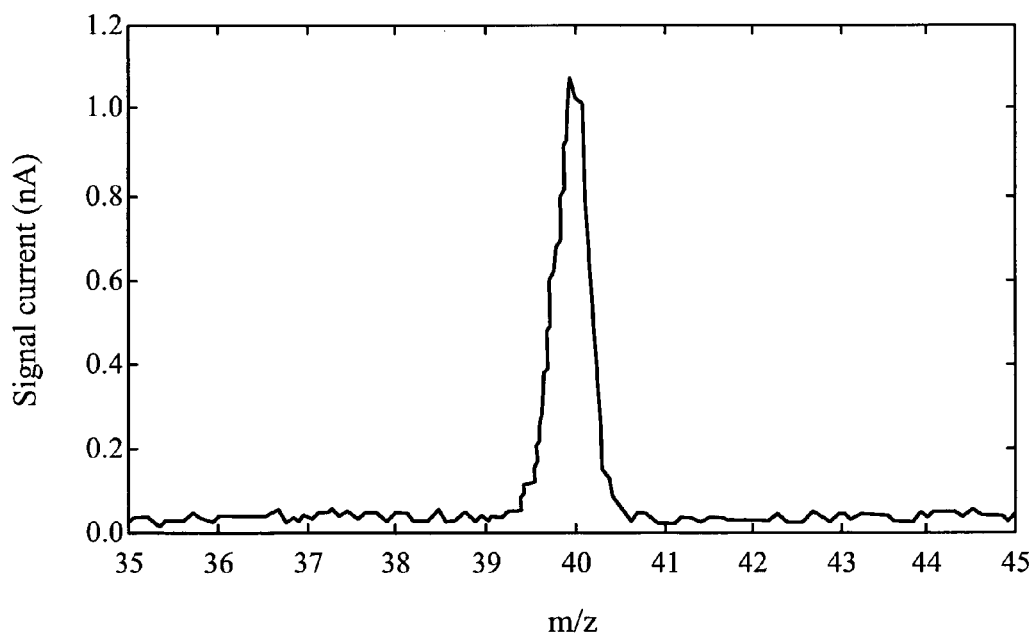
FIG. 3: Experimentally obtained mass spectrum for argon obtained using the hyperbolic mass filter fabricated according to the embodiment of the method of the invention.

By this technique, it is possible to achieve a hyperbolic profile with an inscribed radius $r_0$ down to 0.9 mm (see FIGS. 2 and 3).

The invention claimed is:

1. A method for fabricating a quadrupole mass filter (QMF) or quadrupole ion trap (QIT) capable of generating a hyperbolic electric field comprising:
   (a) cutting four elongate erodible metal workpieces axially at opposing extremities;
   (b) substantially parallel mounting the four elongate erodible metal workpieces axially in an elongate slot in an insulating housing in a mutually spaced apart disposition such that an axial bore is formed therebetween whereby a first part of each elongate erodible metal workpiece is freely inward facing and said cutting forms a recess remote from the axis of the insulating housing;
   (c) electrically connecting the erodible metal workpieces; and
   (d) generating a plurality of electrical discharges between the erodible metal workpiece and a wire electrode as the wire electrode passes through the axial bore to erode the erodible metal of the first part of the erodible metal workpiece to a hyperbolic profile.

2. A method as claimed in claim 1 wherein the hyperbolic profile has an inscribed radius ($r_0$) of less than 1 mm.

3. A method as claimed in claim 1 wherein the hyperbolic profile has an inscribed radius ($r_0$) in the range 400 microns to 0.9 mm.

4. A method as claimed in claim 1 wherein the shape of each elongate erodible metal workpiece is substantially quadrantal.

5. A method as claimed in claim 1 wherein in step (a) the four elongate erodible metal workpieces are cut substantially rectangularly.

6. A method as claimed in claim 1 wherein in step (b), the four erodible metal workpieces are substantially parallel mounted such that the recess formed by said cutting is adjacent to the circumference of the elongate slot.

7. A method as claimed in claim 1 wherein the hyperbolic profile has an inscribed radius ($r_0$) in the range 0.1 mm to 0.9 mm.

8. A method as claimed in claim 1 wherein the quadrupole mass filter (QMF) or quadrupole ion trap (QIT) is capable of generating a hyperbolic electric field.

9. A method as claimed in claim 1 wherein the quadrupole mass filter (QMF) or quadrupole ion trap (QIT) in use generates an electric field described by the potential variation: $\Phi(x,y,z)=\Phi_0(x^2-y^2)/2r_0^2$.

* * * * *